US007827634B2

(12) United States Patent
Stroth et al.

(10) Patent No.: US 7,827,634 B2
(45) Date of Patent: Nov. 9, 2010

(54) SYSTEM AND METHOD FOR BED TRANSPORT

(75) Inventors: Glenn Stroth, Marion, TX (US); Chris Niederkrom, San Antonio, TX (US); Malcolm Thomson, San Antonio, TX (US); Joe A. Alvarez, San Antonio, TX (US); Kenneth Knowles, Bandera, TX (US); Robert Sepulveda, San Antonio, TX (US); Martin Rodriguez, San Antonio, TX (US); Bruce Allen, San Antonio, TX (US); Jose Sablan, San Antonio, TX (US); Kevin Bendele, Adkins, TX (US)

(73) Assignee: KCI Licensing, Inc., San Antonio, TX (US)

( * ) Notice: Subject to any disclaimer, the term of this patent is extended or adjusted under 35 U.S.C. 154(b) by 740 days.

(21) Appl. No.: 11/735,143

(22) Filed: Apr. 13, 2007

(65) Prior Publication Data

US 2007/0241529 A1 Oct. 18, 2007

Related U.S. Application Data

(60) Provisional application No. 60/792,998, filed on Apr. 17, 2006.

(51) Int. Cl.
*A61G 7/08* (2006.01)
*B62D 51/04* (2006.01)

(52) U.S. Cl. ............................ 5/510; 5/86.1; 5/81.1 R; 180/19.1; 280/47.11

(58) Field of Classification Search .................... 5/510, 5/86.1, 81.1 R, 600; 180/19.1, 19.2, 19.3; 280/43.17, 47.11
See application file for complete search history.

(56) References Cited

U.S. PATENT DOCUMENTS

| | | | | |
|---|---|---|---|---|
| 4,348,634 | A | 9/1982 | David et al. | |
| 5,180,320 | A | 1/1993 | Calamia et al. | |
| 5,279,010 | A | 1/1994 | Ferrand et al. | |
| 5,443,439 | A | 8/1995 | Ohshita | |
| 5,580,207 | A * | 12/1996 | Kiebooms et al. | 414/495 |
| 6,320,510 | B2 | 11/2001 | Menkedick et al. | |
| 6,330,926 | B1 | 12/2001 | Helmbrock et al. | |
| 6,729,421 | B1 | 5/2004 | Gluck et al. | |
| 6,772,850 | B1 | 8/2004 | Waters et al. | |
| 7,191,854 | B2 * | 3/2007 | Lenkman | 180/65.1 |
| 7,419,019 | B1 * | 9/2008 | White et al. | 180/19.3 |
| 2007/0241529 | A1 * | 10/2007 | Stroh et al. | 280/202 |

* cited by examiner

*Primary Examiner*—Robert G Santos

(57) ABSTRACT

A system and method for a bed transport. The system may include a drive system configured to couple to a bed frame and to provide powered movement of the bed frame. The system may also include a substantially vertical control arm and a control handle coupled to the control arm. The system may also comprise a switch on the control handle, and the switch may be configured to control a function of the drive system.

22 Claims, 7 Drawing Sheets

SYSTEM AND METHOD FOR BED TRANSPORT

CROSS-REFERENCES TO RELATED APPLICATIONS

This application claims priority to U.S. Provisional Patent Application No. 60/792,998, filed Apr. 17, 2006, which is incorporated by reference herein without disclaimer.

FIELD

Exemplary embodiments of the present invention relate to beds used for patients; more particularly, exemplary embodiments relate to a control and drive system used for powered movement of a bed from one location to another.

BACKGROUND

A variety of different transport systems are available for movement of a patient bed in a healthcare facility. While these systems accomplish the basic task of enabling powered movement of a bed with or without a patient thereon, these systems are not without their issues.

A first example of a patient bed transport system is offered by the Stryker Corporation under the "Zoom" designation, and by the Hill-Rom Company under the "Intellidrive" designation. Both of these systems use two push-pull type controls. The push-pull controls on the sides at the end of the patient bed have a movable handle with a horizontally-oriented hand grip. The horizontally-oriented hand grip is either pushed or pulled for powered movement of the patient bed. Those using patient beds offered by either the Stryker Corporation or the Hill-Rom Company may find difficulty in controlling the speed of movement of the bed while trying to maneuver the bed, especially when steering through crowded hallways and around the corners in the corridors of a healthcare facility. In addition, if a healthcare professional is moving either a patient bed offered by either the Stryker Corporation or the Hill-Rom Company backwards and inadvertently stumbles or falls while pulling back on the control handles, the bed may continue to move and possibly injure the healthcare professional.

A second example of a patient bed transport system is the bariatric bed being offered by Burke, Inc. under the "TriFlex" designation. The bariatric bed offered by Burke, Inc. uses a joystick assembly for controlling the direction and speed of movement of the bed. Healthcare professionals may find that controlling the direction and speed of movement of the bariatric bed offered by Burke, Inc. requires both training and practice. Unfortunately, critical situations in healthcare facilities do not always provide the needed time for training and practice before moving a powered patient bed.

Accordingly, a need remains in the art for devices and methods that improve upon the provision of powered movement capability for patient supports, particularly in ways that require little or no training and practice and are easy and safe to operate, while also being affordable and easy to install, service and maintain.

SUMMARY

Exemplary embodiments of the present invention comprise a system for transporting a bed comprising a bed frame. In certain exemplary embodiments, the system comprises a drive system, wherein the drive system is configured to couple to the bed frame and to provide a powered movement of the bed frame; a first control arm, wherein the control arm is configured to couple to the bed frame; a first control handle coupled to the control arm; and a first switch on the first control handle, wherein the switch is configured to control a function of the drive system. In certain exemplary embodiments, the first control arm is configured to provide manual movement of the bed in a left direction, a right direction, a forward direction, and a reverse direction. In certain exemplary embodiments, the drive system is configured to provide powered movement in a forward direction and a reverse direction. In certain exemplary embodiments, the drive system comprises a drive motor and a drive wheel, and the first switch controls the speed of the drive motor. In certain exemplary embodiments, the first switch raises and lowers the drive system, the first control arm is substantially vertical and the first control handle is substantially vertical.

In certain exemplary embodiments, a second control arm is configured to couple to the bed frame and to provide manual movement of the bed and a second control handle is coupled to the first control arm. In certain exemplary embodiments, the second control handle comprises a second switch, and the first switch is configured to control the speed of the drive system, while the second switch is configured to control the application of power to the drive system. In certain exemplary embodiments, the second control handle is substantially vertical and the second control handle comprises a third switch and the third switch is configured to raise and lower the drive system. Certain exemplary embodiments comprise a directional switch configured to control the direction of the powered movement of the bed and caster wheels configured to couple to the frame. Certain exemplary embodiments comprise a lockout switch on the first control arm, wherein the lockout switch is located distal from the first control handle.

Certain exemplary embodiments comprise a bed frame comprising a first end, a second end, and a pair of longitudinal sides extending between the first end and the second end; a powered drive system coupled to the bed frame; a first substantially vertical control arm coupled to the bed frame proximal to the first end; a second substantially vertical control arm coupled to the bed frame proximal to the first end; a first control handle coupled to the first substantially vertical control arm; a second control handle coupled to the first substantially vertical control arm; and a first switch on the first substantially vertical control arm, where the first switch is configured to control the application of power to the powered drive system. Certain exemplary embodiments also comprise a second switch on the first or second control handle, wherein the second switch is configured to control the application of power to the powered drive system. In other exemplary embodiments, the first or second switch is configured to control the speed of the powered drive system. Still other exemplary embodiments comprise a lockout switch on either the first or second substantially vertical control arm. Certain exemplary embodiments also comprise a switch on either the first or second control handle, wherein the switch is configured to raise and lower the powered drive system. In other exemplary embodiments, the first control handle and the second control handle are substantially vertical.

Certain exemplary embodiments comprise a method of transporting a patient support surface, the method comprising: providing a patient support surface; providing a frame to support the patient support surface; providing a drive system coupled to the frame; providing a first substantially vertical control arm and a second substantially vertical control arm coupled to the frame; providing a first control handle coupled to the first substantially vertical control arm; providing a second control handle coupled to the second substantially vertical control arm; providing a first switch on either the first or second control handle; engaging the drive system with a floor beneath the frame; applying power to the drive system by operating the first switch; and activating the drive system to transport the frame. Other embodiments comprise exerting a force on the first control handle or the second control handle to steer the bed frame and regulating a speed at which the patient transport surface is transported by manipulating the first switch. Still other embodiments comprise providing a second switch on the first substantially vertical control arm or on the second substantially vertical control arm, wherein the second switch is configured to control the application of power to the drive system.

BRIEF DESCRIPTION OF THE DRAWING FIGURES

Although the scope of the present invention is much broader than any particular embodiment, a detailed description of an exemplary embodiment follows, together with illustrative figures, wherein like reference numerals refer to like components, and wherein.

DESCRIPTION OF THE EMBODIMENTS

Figure 1:
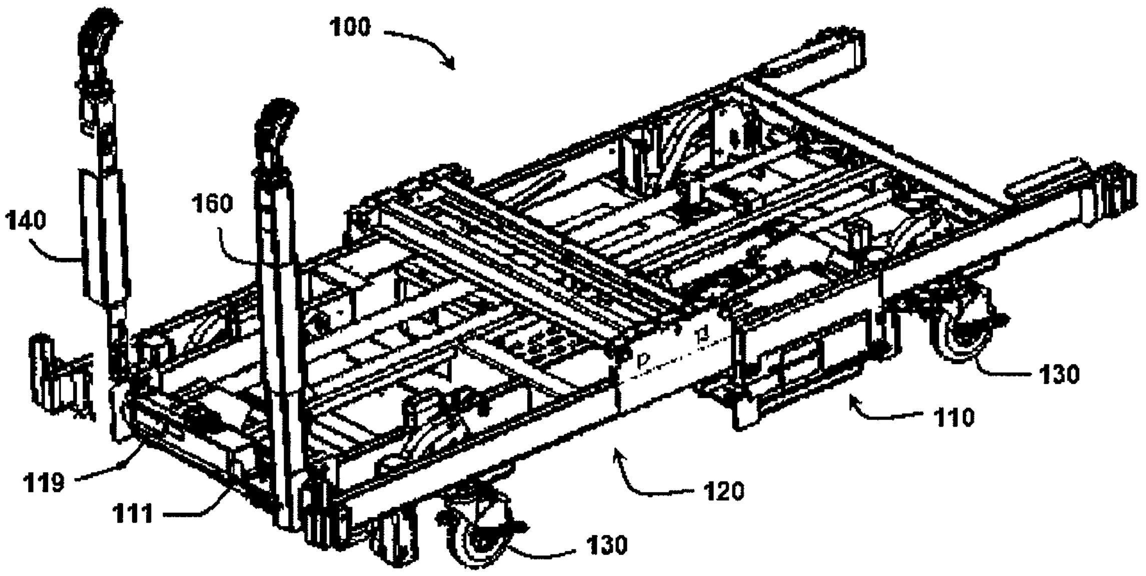
FIG. 1 is a first perspective view of a bed frame with controls and drive system of an exemplary embodiment.
Figure 1A:
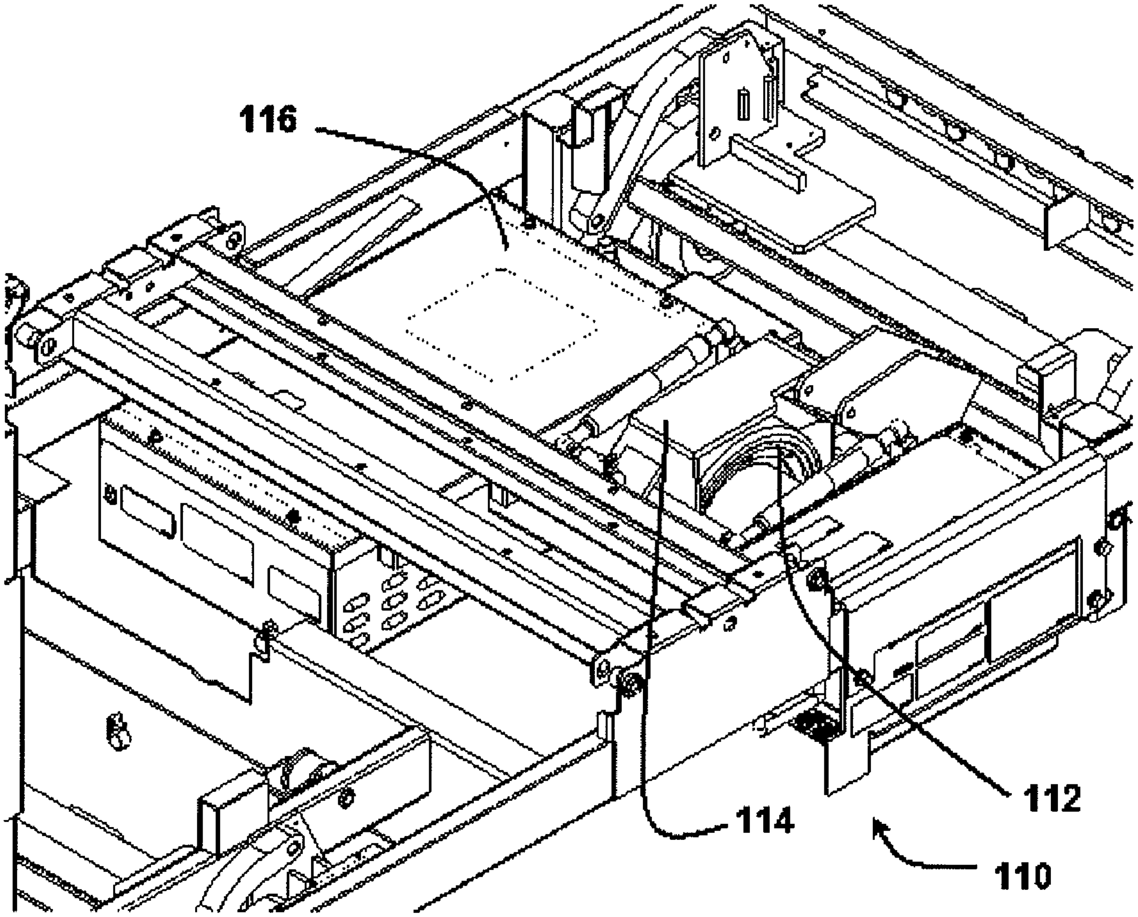
FIG. 1A is a perspective view of a bed frame and drive system of the embodiment of FIG. 1.

As shown in FIG. 1 and FIG. 1A, an exemplary embodiment of the present invention comprises a medical bed 100 equipped with a drive system 110 coupled to a bed frame 120 and generally between a set of casters 130 of bed 100. In FIGS. 1 and 1A, a mattress or other patient support is not shown, so that features of bed frame 120 and drive system 110 may be visible. It is understood by those skilled in the art that such a mattress or other patient support may be included in exemplary embodiments. Bed 100 also comprises a left control arm 140 and a right control arm 160. Many beds may be suitable for use with exemplary embodiments of the present invention, including KCI USA's (San Antonio, Tex.) commercial BariMaxx® II or BariAir® models. In the exemplary embodiment shown in FIGS. 1 and 1A, drive system 110 comprises a drive wheel 112, a motor 114, a battery 116 and related circuitry for powering drive wheel 112 as would be understood by one of ordinary skill in the art. Bed 100 also comprises a junction box 119 for providing electrical energy for charging battery 116 and a cord wrap 111 for storing electrical cords when not in use.

In certain exemplary embodiments, motor 114 is a 3 phase AC motor coupled to drive wheel 112, and the circuitry comprises a 24-volt AC electrical energy supply and a battery charging circuit. The battery charging circuit enables the needed electrical energy to be stored in battery 116 when bed 100 is connected to a source of electrical power at junction box 119. After charging, battery 116 can be used to power drive system 110 during transport, so that drive system 110 can provide powered movement of bed 100 without an electrical connection being maintained at junction box 119. Also included within the circuitry is a lock-out circuit so that when bed 100 is plugged into a 120-volt AC line current or other source of electrical energy, motor 114 cannot be operated.

In the exemplary embodiment shown, drive system 110 is coupled to bed frame 120 and moves together with the central portion of bed frame 120. While the outer perimeter of bed frame 120 that is coupled to caster wheels 130 remains in a relatively fixed vertical position, the central portion of bed frame 120 can be raised or lowered by bed controls (discussed in more detail below). Drive system 110 can be positioned so that drive wheel 112 is in contact with the floor on which bed 100 rests. This contact of drive wheel 112 with the floor provides the necessary frictional force to cause bed 100 to move in response to rotation of drive wheel 112 and enables drive system 110 to provide powered movement of bed 100. Caster wheels 130 can also provide rolling support for the perimeter of bed frame 120 when rotational power is applied to drive wheel 112.

In the exemplary embodiment shown in FIG. 1, left control arm 140 and right control arm 160 extend substantially vertically from one end of bed frame 120 and bed 100. Right and left control arms 140 and 160 may be spaced far enough apart that a healthcare professional can move therebetween to gain access to a patient if needed. Those of ordinary skill in the art will understand that left and right control arms 140 and 160 not only provide convenient location for various controls, but may also be used to aid in moving bed 100 manually when needed.

Figure 2:
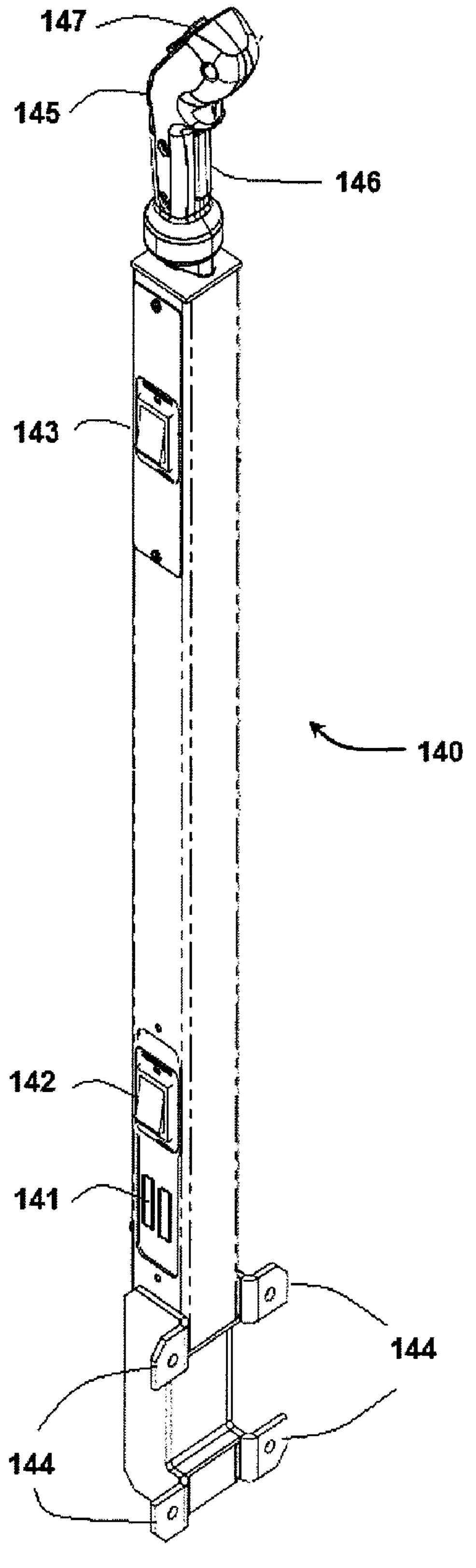
FIG. 2 is a perspective view of the left control arm of the embodiment of FIG. 1.
Figure 2A:
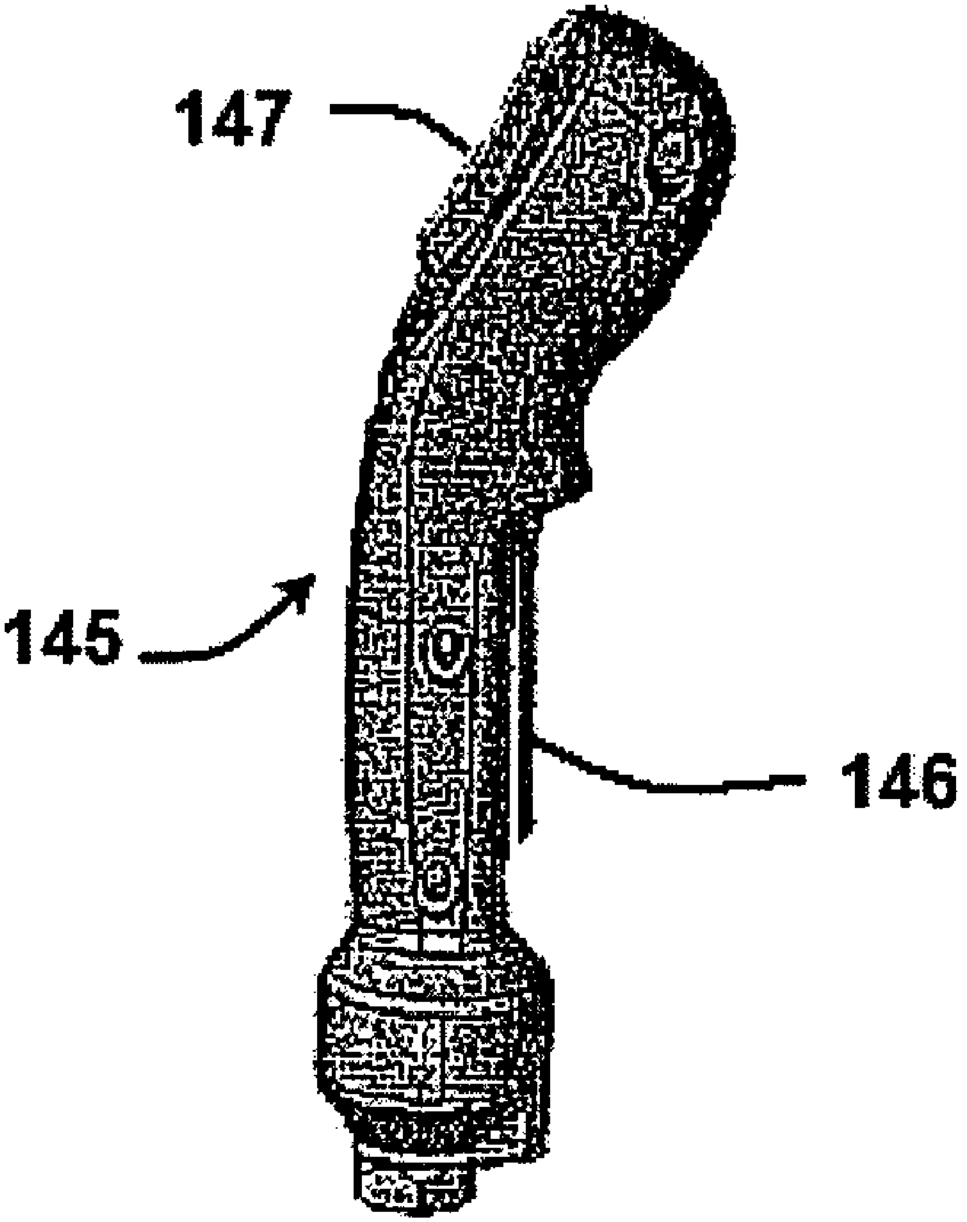
FIG. 2A is a side elevation view of the left control handle of the embodiment of FIG. 1.

As shown in FIG. 2 and FIG. 2A, left control arm 140 comprises a set of electrical connections 141, a lockout switch 142, and a power switch 143. Electrical connections 141 may be used to electrically couple left control arm 140 to drive system 110 or other devices. Left control arm 140 also comprises a set of flanges 144 that allow left control arm 140 to be coupled to bed frame 120 with a pair of brackets (not shown) or other connection mechanism. A vertically-oriented left control handle 145 is also coupled to the upper end of left control arm 140. Left control handle 145 comprises a run switch 146 and a raise/lower switch 147.

Figure 3:
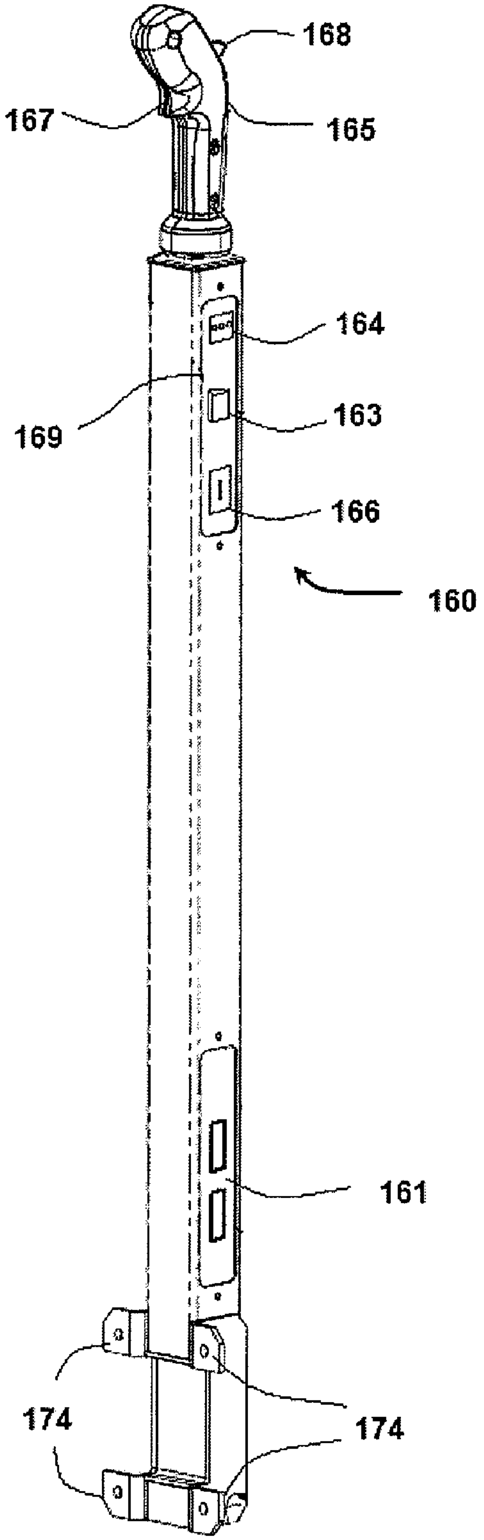
FIG. 3 is a perspective view of the right control arm of the embodiment of FIG. 1.
Figure 3A:
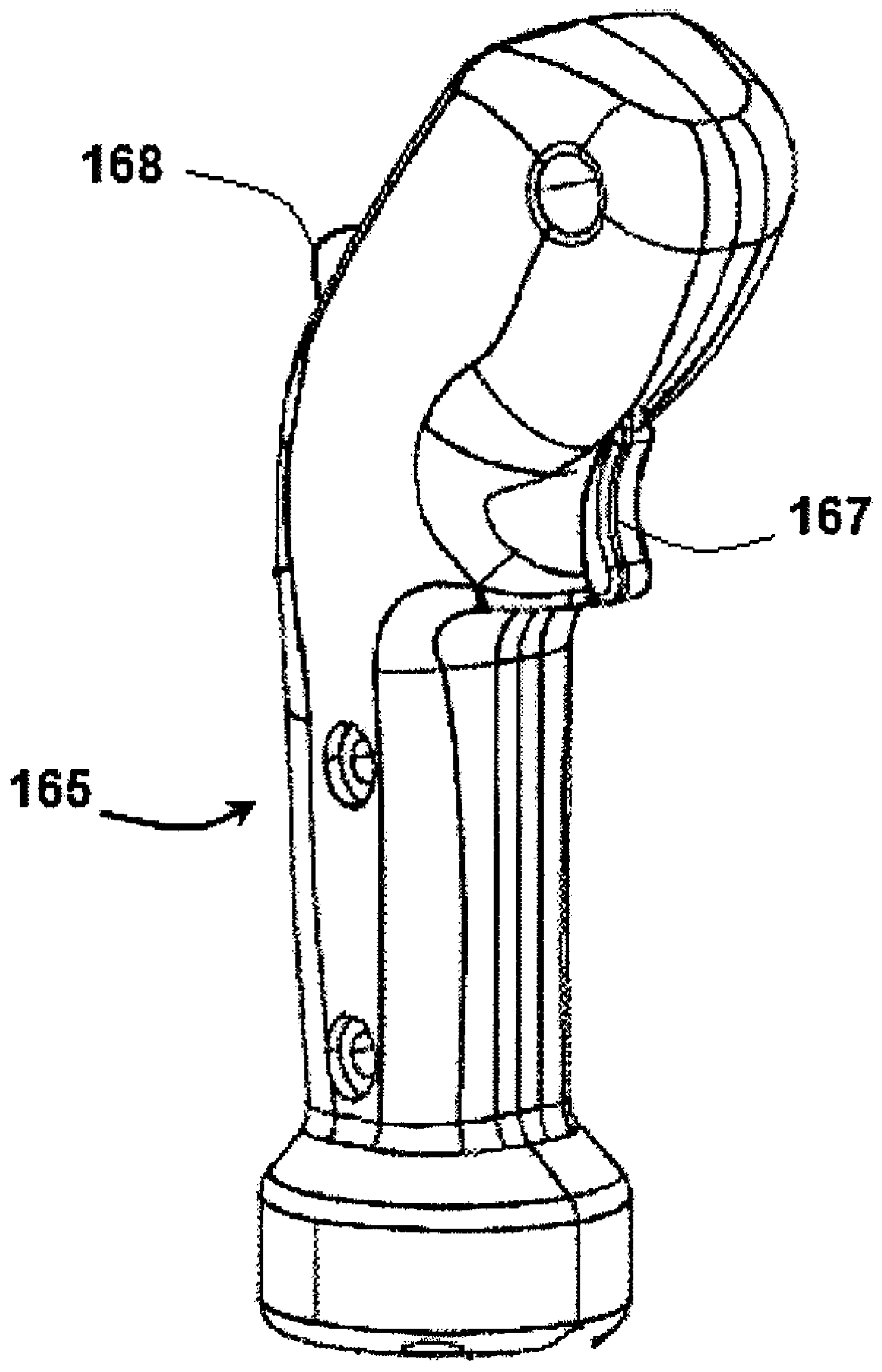
FIG. 3A is a perspective view of the right control handle of the embodiment of FIG. 1.
Figure 3B:
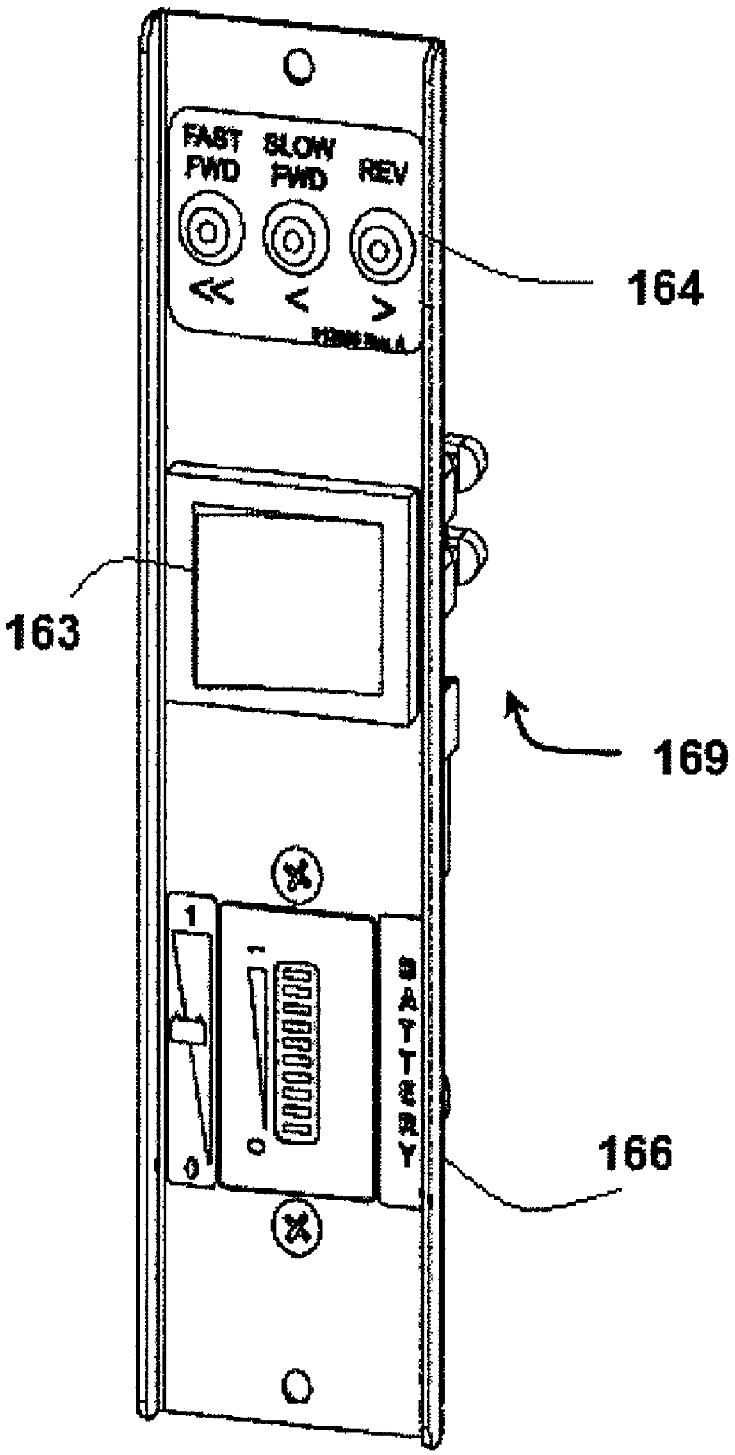
FIG. 3B is perspective of a portion of the right control arm of the embodiment of FIG. 1.

As shown in FIGS. 3, 3A, and 3B right control arm 160 comprises a set of electrical connections 161 and a panel 169 with a directional control switch 163, a series of direction/speed indicators 164, and a battery level indicator 166 to display the charge condition of the battery. Electrical connections 161 may be used to electrically couple right control arm 160 to drive system 110 or other devices. A detailed view of panel 169 is shown in FIG. 3B. A vertically-oriented right control handle 165, comprising a throttle trigger 167 and a buzzer or horn button 168, is coupled to the upper end of right control arm 160. Right control arm 160 also comprises a set of flanges 174 that allow right control arm 160 to be attached to bed frame 120 with a pair of brackets (not shown) or other connection mechanism.

It will be understood by those skilled in the art that the steps described for operation and control of drive system 110 do not necessarily have to be performed in the order presented in this discussion. In other embodiments, the order of certain steps may be varied, and certain steps may be combined into one step.

In an exemplary embodiment, to prepare for movement of bed 100 and operation of drive system 110, a healthcare professional may secure the patient in bed 100 for transport. For example, the healthcare professional may raise the side rails and retract any extenders which might interfere with movement of bed 100. The patient may then prepared for movement by unhooking the patient from any non-movable connections such as oxygen, stationary infusion systems, or stationary monitoring systems.

The healthcare professional may then unplug the power cord and wrap any loose electrical cords (not shown) around cable storage spool 111. After assuring that all casters 130 are unlocked, the healthcare professional can manually move bed 100 away from a wall or other obstruction, and into a predetermined path for movement. Such non-powered movement can be accomplished by manually exerting a force on right and left control arms 140 and 160 (or right or left control handles 145 and 165) in the desired direction of movement.

In the exemplary embodiment shown, prior to operation of drive system 110 and powered movement of bed 100, lockout switch 142 is moved to the unlocked position and power switch 143 to the on position. The direction of movement, forward or backward can be set by the position of the directional control switch 163. In certain embodiments, directional control switch 163 may comprise multiple settings for macro control of the speed at which drive system 110 will move bed 100. For example, directional control switch 163 may comprise a slow forward speed position and a fast forward speed position, as well as a single reverse speed position.

A healthcare professional or other bed operator may then place his or her left hand on left control handle 145 and his or her right hand on right control handle 165. The operator can activate raise/lower switch 147 with his or her thumb to lower the portion of bed frame 120 to which drive system 110 is coupled so that drive wheel 112 engages the floor. Although the structural geometry of the exemplary embodiment shown inherently ensures that the drive wheel is in contact with a flat floor whenever bed frame 120 is fully lowered, alarms, actuators and other mechanisms for ensuring floor contact can be provided in other exemplary embodiments. Run switch 146 can be depressed by gripping left control handle 145 with the left hand, and movement of bed 100 can be initiated by squeezing throttle trigger 167 on right control handle 165.

In certain embodiments, the speed at which drive system 110 transports bed 100 can be controlled by the amount that throttle trigger 167 is depressed. For example, if throttle trigger 167 is depressed a slight amount, drive system 110 will rotate drive wheel 112 at a relatively low speed and bed 100 will move at a relatively low speed. However, if throttle trigger 167 is more fully depressed, then drive system 110 will rotate drive wheel 112 at a relatively higher speed and bed 100 will move at a relatively higher speed. As previously mentioned, a macro control of the transport speed can be controlled by the position of directional control switch 163. Direction/speed indicators 164 can provide visual feedback to the user of the position of directional control switch 163.

In the exemplary embodiment shown, drive system 110 and drive wheel 112 provide forward or reverse movement of bed 100. The operator is able to control left or right movement of bed 100 by exerting a force on left control arm 140 and/or right control arm 160. In the exemplary embodiment shown, an operator can exert a force on left control arm 140 via left control handle 145. Similarly, an operator can exert a force on right control arm 160 via right control handle 165. Left control arm 140 and right control arm 160 are coupled to bed frame 120 and can therefore transfer the force applied by an operator from left control arm 140 and right control arm 160 to bed frame 120. Therefore, an operator can provide manual, non-powered movement of bed frame 120 by exerting a force on left control handle 145 and right control handle 165. As previously described, run switch 146 is located on left control handle 145 and throttle trigger 167 is located on right control handle 165. Therefore, an operator can control the powered forward/reverse and manual left/right movement of bed 100 while the operator keeps his or her hands on left control handle 145 and right control handle 165. If desired, an operator can also provide forward or reverse manual movement of bed frame 120 when drive system 110 is not providing powered movement of bed frame 120.

The exemplary embodiment shown incorporates multiple safety features and aspects. For example, if an operator releases either left control handle 145 (and run switch 146) or right control handle 165 (and throttle trigger 167), then power will be cut off to motor 114 and drive wheel 112 will cease rotating. As a result, drive system 110 will no longer provide powered movement of bed 100. As previously described, both lockout switch 142 and power switch 143 must be in the proper position to allow operation of drive system 110. As shown in FIG. 1A, in certain exemplary embodiments, lockout switch 142 may be placed in a position that is fairly obscure or not obvious and is away from left control handle 145 and right control handle 165. Such a location may minimize the chance that drive system 110 is operated unintentionally or by an unauthorized operator. In addition, during operation, an operator can engage horn button 168 to warn others without removing his or her hand from right control handle 165.

Furthermore, additional features such as a light system may be added to assist in navigating dark hallways. If desired, a warning light may also be added to alert others of bed movement—particularly, in emergency situations. A scale system for weighing the patient (when drive wheel 112 is not in contact with the floor) may also be provided.

Those of ordinary skill will understand that the distribution of the controls between left and right control arms 140 and 160 and left and right control handles 145 and 165 may be changed depending on user preference. Moreover, many alternatives, modifications and the like may be made to both drive system 110 as well bed 100 itself while still embracing exemplary embodiments of the invention.

What is claimed is:

1. A system for transporting a bed comprising a bed frame, the system comprising:

a drive system, wherein the drive system is configured to couple to the bed frame and to provide a powered movement of the bed frame;

a first control arm and a second control arm, wherein the first and second control arms are coupled to the bed frame, and wherein the first and second control arms are spaced apart to allow a user to move between the first and second control arms;

a first control handle coupled to the first control arm; and a first switch on the first control handle, wherein the first switch is configured to control a function of the drive system, and wherein the first control handle is substantially vertical.

2. The system of claim 1 wherein the first control arm is configured to provide a manual movement of the bed in a left direction, a right direction, a forward direction, and a reverse direction.

3. The system of claim 1 wherein the drive system is configured to provide powered movement in a forward direction and a reverse direction.

4. The system of claim 1 wherein the drive system comprises a drive motor and a drive wheel.

5. The system of claim 4 wherein the first switch controls the speed of the drive motor.

6. The system of claim 1 wherein the first switch raises and lowers the drive system.

7. The system of claim 1 wherein the first control arm is substantially vertical.

8. The system of claim 1 further comprising:

a second control handle coupled to the second control arm.

9. The system of claim 8 wherein:

the second control handle comprises a second switch;

the first switch is configured to control the speed of the drive system; and the second switch is configured to control the application of power to the drive system.

10. The system of claim 9 wherein the second control handle is substantially vertical and the first control handle comprises a third switch and the third switch is configured to raise and lower the drive system.

11. The system of claim 1 further comprising a directional switch configured to control the direction of the powered movement of the bed.

12. The system of claim 1 further comprising caster wheels configured to couple to the frame.

13. The system of claim 1 further comprising a lockout switch on the first control arm, wherein the lockout switch is located distal from the first control handle.

14. A patient transport system comprising:

a bed frame comprising a first end, a second end, and a pair of longitudinal sides extending between the first end and the second end;

a powered drive system coupled to the bed frame;

a first substantially vertical control arm coupled to the bed frame proximal to the first end;

a second substantially vertical control arm coupled to the bed frame proximal to the first end, wherein the first and second substantially vertical control arms are spaced apart;

a first control handle coupled to the first substantially vertical control arm;

a second control handle coupled to the second substantially vertical control arm;

a first switch on the first substantially vertical control arm, where the first switch is configured to control the application of power to the powered drive system; and a second switch on the second substantially vertical control arm, where the second switch is configured to control the speed of the powered drive system, and wherein the first control handle and the second control handle are substantially vertical.

15. The patient transport system of claim 14, further comprising:

a second switch on the first or second control handle, wherein the second switch is configured to control the application of power to the powered drive system.

16. The patient transport system of claim 14, further comprising a third switch on the first or second control handle, wherein the first switch or the second switch is configured to control the speed of the powered drive system.

17. The patient transport system of claim 14, further comprising a lockout switch on either the first or second substantially vertical control arm.

18. The patient transport system of claim 14, further comprising a third switch on either the first or second control handle, wherein the third switch is configured to raise and lower the powered drive system.

19. A method of transporting a patient support surface, the method comprising:

providing a patient support surface;

providing a frame to support the patient support surface;

providing a drive system coupled to the frame;

providing a first substantially vertical control arm and a second substantially vertical control arm coupled to the frame;

providing a first vertical control handle coupled to the first substantially vertical control arm;

providing a second vertical control handle coupled to the second substantially vertical control arm;

providing a first switch on either the first or second vertical control handle;

engaging the drive system with a floor beneath the frame;

applying power to the drive system by operating the first switch; and activating the drive system to transport the frame.

20. The method of claim 19, further comprising:

exerting a force on the first vertical control handle or the second vertical control handle to steer the frame.

21. The method of claim 20, further comprising:

regulating a speed at which the patient transport surface is transported by manipulating the first switch.

22. The method of claim 21, further comprising:

providing a second switch on the first substantially vertical control arm or on the second substantially vertical control arm, wherein the second switch is configured to control the application of power to the drive system.

* * * * *

UNITED STATES PATENT AND TRADEMARK OFFICE

CERTIFICATE OF CORRECTION

PATENT NO. : 7,827,634 B2
APPLICATION NO. : 11/735143
DATED : November 9, 2010
INVENTOR(S) : Glenn Stroh et al.

It is certified that error appears in the above-identified patent and that said Letters Patent is hereby corrected as shown below:

On the Title page of the Letters Patent, in the "Inventors" section (75), the text which now reads, "Glenn Stroth" should be corrected to read --Glenn Stroh--.

Signed and Sealed this
Twenty-second Day of February, 2011

David J. Kappos
*Director of the United States Patent and Trademark Office*